United States Patent
Nagasaka et al.

(10) Patent No.: US 9,222,796 B2
(45) Date of Patent: Dec. 29, 2015

(54) MAP DISPLAY SYSTEM, MAP DISPLAY METHOD, AND COMPUTER-READABLE STORAGE MEDIUM

(75) Inventors: Hidenori Nagasaka, Aichi (JP); Takayasu Tanaka, Aichi (JP); Hiroyuki Yoshida, Aichi (JP)

(73) Assignee: AISIN AW CO., LTD., Aichi-ken (JP)

( * ) Notice: Subject to any disclaimer, the term of this patent is extended or adjusted under 35 U.S.C. 154(b) by 746 days.

(21) Appl. No.: 12/945,265

(22) Filed: Nov. 12, 2010

(65) Prior Publication Data

US 2011/0161864 A1 Jun. 30, 2011

(30) Foreign Application Priority Data

Dec. 25, 2009 (JP) ................... 2009-293727

(51) Int. Cl.
*G06F 3/048* (2013.01)
*G01C 21/36* (2006.01)
*G06F 3/0484* (2013.01)

(52) U.S. Cl.
CPC .......... *G01C 21/367* (2013.01); *G01C 21/3682* (2013.01); *G06F 3/04845* (2013.01)

(58) Field of Classification Search
CPC .................................................. G06F 3/0485
USPC ........................................................ 715/784
See application file for complete search history.

(56) References Cited

U.S. PATENT DOCUMENTS

| 5,123,087 A | 6/1992 | Newell et al. |
| 5,655,030 A * | 8/1997 | Suzuki ........................... 382/152 |
| 2004/0204833 A1 | 10/2004 | Yokota |
| 2005/0177305 A1 | 8/2005 | Han |
| 2007/0226646 A1 * | 9/2007 | Nagiyama et al. ............. 715/784 |
| 2008/0306683 A1 * | 12/2008 | Ando et al. .................... 701/207 |
| 2009/0088964 A1 * | 4/2009 | Schaaf et al. .................. 701/200 |
| 2009/0119613 A1 | 5/2009 | Nakaya |
| 2009/0146968 A1 | 6/2009 | Narita et al. |

FOREIGN PATENT DOCUMENTS

JP 2008-304325 A 12/2008

OTHER PUBLICATIONS

Extended European Search Report, dated Apr. 5, 2013, issued in corresponding European Application No. 10191556.9.
Bier, et al., "Snap-Dragging," Dallas, Aug. 18-22, pp. 233-240, vol. 20, No. 4, 1986.

* cited by examiner

*Primary Examiner* — Angie Badawi
(74) *Attorney, Agent, or Firm* — Sughrue Mion, PLLC

(57) ABSTRACT

A map display system including a unit that stores map information including information about a facility icon, a display unit, a position detecting unit that detects a touch position on the screen of the display unit when the screen is touched, and a scroll control unit that performs follow scrolling in which a map image on the display unit is scrolled following movement of the touch position detected by the position detecting unit, and that performs inertial scrolling in which the map image is scrolled on the basis of a moving direction and speed of the touch position when touching the screen is released. When the facility icon is placed in a first given region having a center at a cursor displayed on the screen while the follow scrolling is being performed, the scroll control unit scrolls the map image so that the facility icon moves to a center position of the cursor and when the facility icon is placed in the first given region while the inertial scrolling is being performed, the scroll control unit continues the inertial scrolling.

5 Claims, 11 Drawing Sheets

MAP DISPLAY SYSTEM, MAP DISPLAY METHOD, AND COMPUTER-READABLE STORAGE MEDIUM

INCORPORATION BY REFERENCE

The disclosure of Japanese Patent Application No. 2009-293727 filed on Dec. 25, 2009 including the specification, drawings and abstract is incorporated herein by reference in its entirety.

BACKGROUND OF THE INVENTION

The present invention relates to a map display system, map display method that display a map on a screen, and a computer-readable storage medium that stores computer-executable instructions for performing the method.

DESCRIPTION OF THE RELATED ART

In an existing art, various techniques for scrolling a map displayed on a screen have been proposed. For example, a navigation system includes a touch panel on the surface of a liquid crystal display. Then, there is a navigation system that is configured so that, when a user moves a fingertip from a selected location PO2 to a location PO3 or a location PO4 while the fingertip remains touching a screen in a state where a map image is displayed on a liquid crystal display, a map image is scrolled from the location PO2 toward the location PO3 or the location PO4 so as to follow movement of the fingertip (for example, see Japanese Patent Application Publication No. 2008-304325 (JP-A-2008-304325)).

SUMMARY OF THE INVENTION

However, according to the navigation system described in JP-A-2008-304325, even when the user touches a facility icon that indicates a facility, such as an amusement park, a palace, a hospital and an airport, displayed in a map image and then the user moves the finger to the position of a cursor displayed on the screen, part of the facility icon or the cursor is hidden by the finger, so it is difficult to make the center position of the facility icon coincide with the center position of the cursor. In addition, it is difficult to touch the center position of the facility icon displayed in the map image, that is, the position (for example, latitude and longitude) of the facility.

The present invention provides a map display system and a map display method that easily make the center position of a cursor displayed on a screen coincide with the center position of a facility icon displayed in a map image by moving a finger while the finger remains touching the facility icon, and a computer-readable storage medium that stores computer-executable instructions for performing the method.

A first aspect of the present invention provides a map display system. The map display system includes: a map information storing unit that stores map information including information on a facility icon; a display unit that displays a map image including the facility icon on a screen of the display unit on the basis of the map information; a position detecting unit that detects a touch position on the screen of the display unit when the screen is touched by a user; and a scroll control unit that performs a control to perform follow scrolling in which the map image is scrolled following movement of the touch position detected by the position detecting unit, and that performs a control to perform inertial scrolling in which the map image is scrolled on the basis of a moving direction and a moving speed of the touch position at the time when touching the screen is released, wherein when the facility icon is placed in a first given region having a center at a cursor displayed on the screen while the follow scrolling is being performed, the scroll control unit performs a control to scroll the map image so that the facility icon moves to a center position of the cursor and, when the facility icon is placed in the first given region while the inertial scrolling is being performed, the scroll control unit performs a control so that the inertial scrolling continues.

A second aspect of the present invention provides a map display method. The map display method includes: displaying a map image including a facility icon on a display device on the basis of map information including information on the facility icon stored in a map information storing device; detecting a touch position when a screen of the display device is touched; performing a control to perform follow scrolling in which the map image is scrolled following movement of the detected touch position; performing a control to perform inertial scrolling in which the map image is scrolled on the basis of a moving direction and a moving speed of the touch position at the time when touching the screen is released; when the facility icon is placed in a given region having a center at a cursor displayed on the screen while the follow scrolling is being performed, performing a control to scroll the map image so that the facility icon moves to a center position of the cursor; and when the facility icon is placed in the given region while the inertial scrolling is being performed, performing a control so that the inertial scrolling continues.

A third aspect of the present invention provides a computer-readable storage medium that stores computer-executable instructions for performing a map display method. The map display method includes: displaying a map image including a facility icon on a display device on the basis of map information including information on the facility icon stored in a map information storing device; detecting a touch position when a screen of the display device is touched; performing a control to perform follow scrolling in which the map image is scrolled following movement of the detected touch position; performing a control to perform inertial scrolling in which the map image is scrolled on the basis of a moving direction and a moving speed of the touch position at the time when touching the screen is released; when the facility icon is placed in a given region having a center at a cursor displayed on the screen while the follow scrolling is being performed, performing a control to scroll the map image so that the facility icon moves to a center position of the cursor; and when the facility icon is placed in the given region while the inertial scrolling is being performed, performing a control so that the inertial scrolling continues.

In the map display system according to the first aspect of the present invention, when the user moves a finger while the finger remains touching a map image, the map image undergoes the follow scrolling. Then, when any one of facility icons that indicate facilities, such as an amusement park, a palace, a hospital and an airport, displayed in the map image is placed in the first given region having a center at the cursor displayed on the screen, the map image is scrolled so that the center position of the facility icon moves to the center position of the cursor. Thus, while the user touches the facility icon, the user sees the cursor and moves the facility icon to around the cursor. By so doing, it is possible to easily display the center position of the facility icon so as to coincide with the center position of the cursor.

In addition, when the map image undergoes the inertial scrolling after touching is released, the map display system continues the inertial scrolling even when the facility icon is placed in the first given region having a center at the cursor. Thus, the user touches a facility icon displayed in the map image with a finger and then quickly slides the finger toward the cursor to thereby make it possible to scroll the facility icon toward the cursor. Because the facility icon is not touched during the inertial scrolling, even when the facility icon is placed in the first given region having a center at the cursor, the inertial scrolling may be continued without moving the center position of the facility icon so as to coincide with the center position of the cursor.

In the map display method according to the second aspect of the present invention, when the user moves a finger while the finger remains touching a map image, the map image undergoes the follow scrolling. Then, when any one of facility icons that indicate facilities, such as an amusement park, a palace, a hospital and an airport, displayed in the map image is placed in the first given region having a center at the cursor displayed on the screen, the map image is scrolled so that the center position of the facility icon moves to the center position of the cursor. Thus, while the user remains touching the facility icon, the user sees the cursor and moves the facility icon to around the cursor. By so doing, it is possible to easily display the center position of the facility icon so as to coincide with the center position of the cursor.

In addition, when the map image undergoes the inertial scrolling after the touch is released, the map display method continues the inertial scrolling even when the facility icon is placed in the first given region having a center at the cursor. Thus, the user touches a facility icon displayed in the map image with a finger and then quickly slides the finger toward the cursor to thereby make it possible to scroll the facility icon toward the cursor. Because the facility icon is not touched during the inertial scrolling, even when the facility icon is placed in the first given region having a center at the cursor, the inertial scrolling may be continued without moving the center position of the facility icon so as to coincide with the center position of the cursor.

Furthermore, in the computer-readable storage medium according to the third aspect of the present invention, a computer reads the storage medium and executes the instructions to thereby undergo the follow scrolling a map image when the user moves a finger while the finger remains touching the map image. Then, when any one of facility icons that indicate facilities, such as an amusement park, a palace, a hospital and an airport, displayed in the map image is placed in the first given region having a center at the cursor displayed on the screen, the computer scrolls the map image so that the center position of the facility icon moves to the center position of the cursor. Thus, while the user touches the facility icon, the user sees the cursor and moves the facility icon to around the cursor. By so doing, it is possible to easily display the center position of the facility icon so as to coincide with the center position of the cursor.

In addition, when the map image undergoes inertial scrolling after touching is released, the computer continues the inertial scrolling even when the facility icon is placed in the first given region having a center at the cursor. Thus, the user touches a facility icon displayed in the map image with a finger and then quickly slides the finger toward the cursor to thereby make it possible to scroll the facility icon toward the cursor. In this case, because the facility icon is not touched, even when the facility icon is placed in the predetermined region having a center at the cursor, the inertial scrolling may be continued without moving the center position of the facility icon so as to coincide with the center position of the cursor.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF THE EMBODIMENTS

Hereinafter, an embodiment in which a map display system, map display method and a computer-readable storage medium that stores computer-executable instructions for performing the method according to the aspect of the present invention are implemented in a navigation system will be described in detail with reference to the accompanying drawings.

Figure 1:
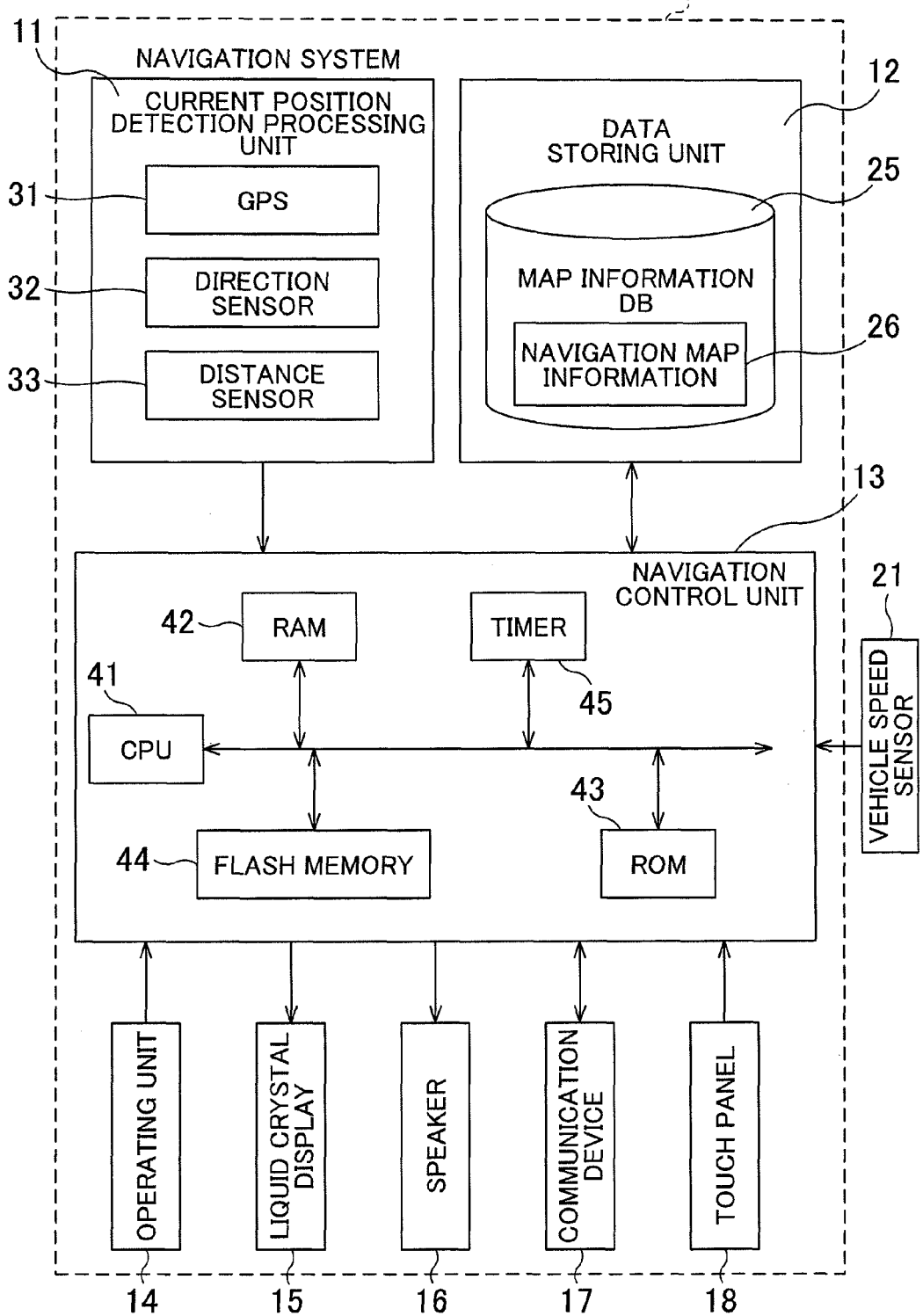
FIG. 1 is a block diagram that shows a navigation system according to an embodiment.

First, the schematic configuration of the navigation system according to the present embodiment will be described with reference to FIG. 1. FIG. 1 is a block diagram that shows the navigation system 1 according to the present embodiment. As shown in FIG. 1, the navigation system 1 according to the present embodiment includes a current position detection processing unit 11, a data storing unit 12, a navigation control unit 13, an operating unit 14, a liquid crystal display 15, a speaker 16, a communication device 17 and a touch panel 18. The current position detection processing unit 11 detects a current position, or the like, of a host vehicle. Various pieces of data are stored in the data storing unit 12. The navigation control unit 13 executes various processings on the basis of input information. The operating unit 14 accepts a user's operation. The liquid crystal display 15 displays information of a map, or the like, for the user. The speaker 16 outputs audio guidance related to route guidance, or the like. The communication device 17 carries out communication with a road traffic information center (not shown), a map information distribution center (not shown), or the like, through a cellular phone network, or the like. The touch panel 18 is attached to the surface of the liquid crystal display 15. In addition, a vehicle speed sensor 21 is connected to the navigation control unit 13. The vehicle speed sensor 21 detects the travelling speed of the host vehicle.

Hereinafter, components that constitute the navigation system 1 will be described. The current position detection processing unit 11 includes a GPS 31, a direction sensor 32, a distance sensor 33, and the like. The current position detection processing unit 11 is able to detect a current position of the host vehicle (hereinafter, referred to as "host vehicle position"), a host vehicle direction that indicates a travelling direction of the host vehicle, a travel distance, and the like.

The data storing unit 12 includes a hard disk (not shown) and a driver (not shown). The hard disk serves as an external storage device and a storing medium. The driver is used to load a map information database (map information DB) 25, a predetermined program, and the like, stored in the hard disk and to write predetermined data to the hard disk.

The map information DB 25 stores navigation map information 26 that is used for the travel guidance and route search of the navigation system 1. Here, the navigation map information 26 includes various pieces of information necessary for route guidance and map display. The navigation map information 26 includes, for example, new road information for identifying new roads, map display data for displaying a map, intersection data related to intersections, node data related to node points, link data related to roads (links), search data for searching for a route, POI (point of interest) data related to a point of interest, such as a shop that is a kind of facility, search data for searching for a location, and the like.

As POI data, data that include name and address, telephone number and a position in a map (for example, a coordinate composed of latitude and a longitude), related to a regional POI, such as a hotel, an amusement park, a palace, a hospital, a gas station, a parking, a train station, an airport and a ferry terminal, a facility icon that is displayed in the map and that indicates the position of a facility, and a range of a facility frame (see FIG. 4) set around each facility icon, which will be described later, are stored together with IDs that identify the POIs. The content of the map information DB 25 is updated by downloading update information, distributed from the map information distribution center (not shown), through the communication device 17.

As shown in FIG. 1, the navigation control unit 13 that constitutes the navigation system 1 includes a CPU 41, an internal storage device, a timer 45, and the like. The CPU 41 serves as a processing unit and a control unit that comprehensively control the navigation system 1. The internal storage device includes a RAM 42, a ROM 43 and a flash memory 44, and the like. The RAM 42 is used as a working memory when the CPU 41 carries out various processings, and stores route data of a route that has been found, and the like. The ROM 43 stores a control program, or the like. The flash memory 44 stores a program loaded from the ROM 43. The timer 45 measures time.

The ROM 43 stores a program of, for example, a touch scrolling process (see FIG. 2) in which a map image is scrolled following movement of a finger touching the screen of the liquid crystal display 15, which will be described later. Furthermore, various peripheral devices (actuators), such as the operating unit 14, the liquid crystal display 15, the speaker 16, the communication device 17 and the touch panel 18, are electrically connected to the navigation control unit 13.

The operating unit 14 is operated when a current position at the start of travelling is corrected, when a departure place as a guidance start location and a destination as a guidance end location are input, or when information related to a facility is searched. The operating unit 14 is formed of various keys and a plurality of operating switches. Then, the navigation control unit 13 controls the navigation system 1 so as to execute various corresponding operations on the basis of switch signals output by pressing the switches.

The liquid crystal display 15 displays map information including a location at which the host vehicle is currently travelling, map information around a destination (see FIG. 4), an operation guide, an operation menu, a guide for a key, a recommended route from a current position to a destination, guidance information along a recommended route, traffic information, news, weather forecast, time, mail, TV programs, and the like.

The speaker 16 outputs audio guidance that guides the vehicle travelling along a recommended route on the basis of a command from the navigation control unit 13, and the like. Here, the output audio guidance is, for example, "200 m ahead, turn right at XX intersection".

The communication device 17 is a communication unit that carries out communication with the map information distribution center through a cellular phone network, or the like. The communication device 17 exchanges the latest version of update map information, or the like, with the map information distribution center. In addition, the communication device 17 receives not only information from the map information distribution center but also traffic information, that includes traffic jam information transmitted from the road traffic information center, or the like, and various pieces of information, such as service area congestion.

In addition, the touch panel 18 is a transparent panel-like touch switch attached to the surface of the liquid crystal display 15. The touch panel 18 is configured to be able to input various commands, perform follow scrolling of a map image as will be described later, or the like, by touching a button or a map displayed on the screen of the liquid crystal display 15. Note that the touch panel 18 may be of a photosensor liquid crystal type, or the like, in which the screen of the liquid crystal display 15 is directly touched.

Next, a touch scrolling process that is executed by the CPU 41 of the thus configured navigation system 1 and that scrolls a map image following movement of a finger touching the screen of the liquid crystal display 15 will be described with reference to FIG. 2 to FIG. 11. Note that the program shown in the flowchart of FIG. 2 is executed by the CPU 41 at an interval of a predetermined period of time (for example, an interval of 10 milliseconds).

Figure 2:
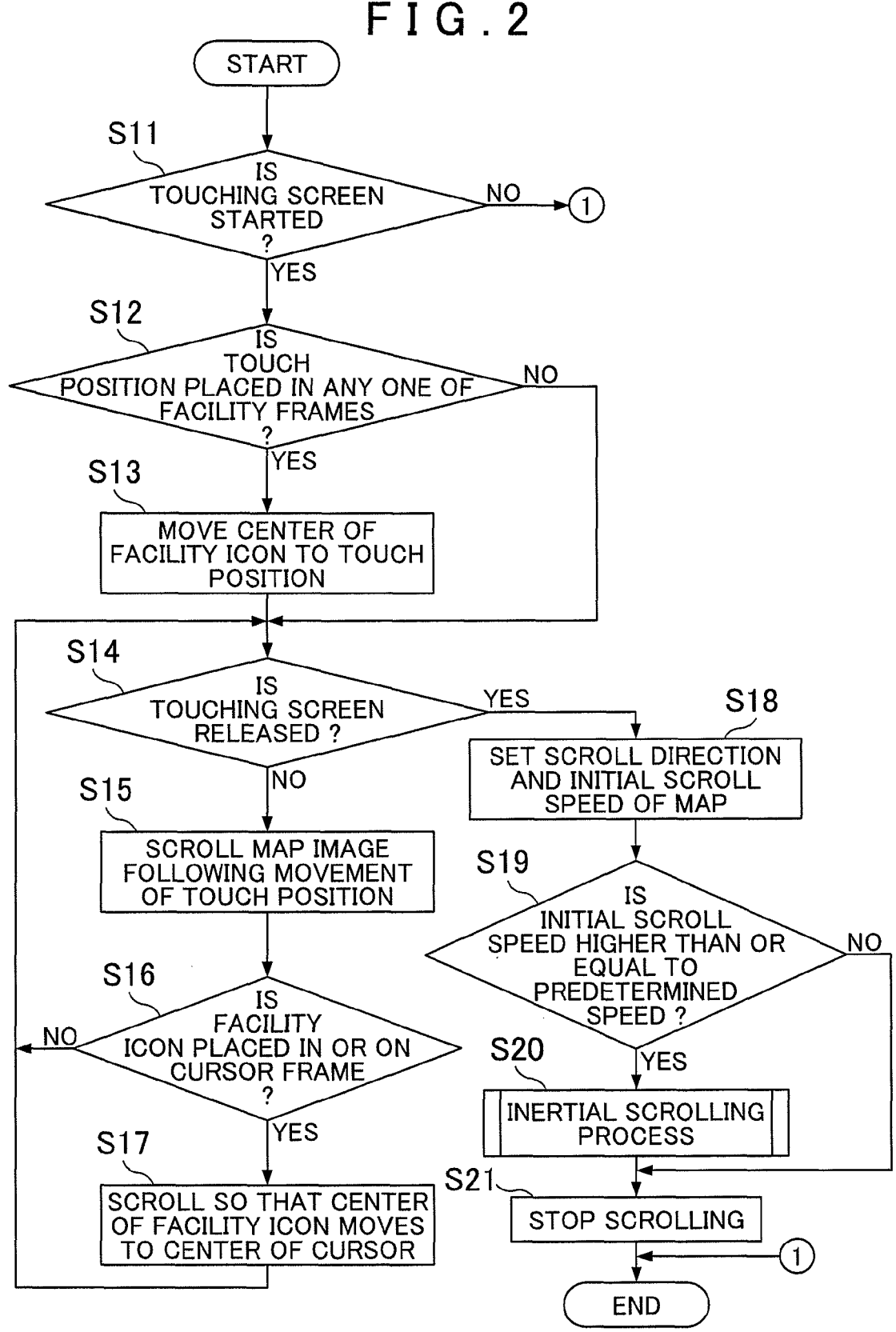
FIG. 2 is a flowchart that shows a touch scrolling process in which a map image is scrolled following movement of a touch position of a finger on a screen.

As shown in FIG. 2, first, in step (hereinafter, abbreviated as S) 11, the CPU 41 determines whether touching the touch panel 18 is started, that is, whether the touch panel 18 is touched. Then, when touching the touch panel 18 is not started, that is, when the touch panel 18 is not touched (S11: NO), the CPU 41 ends the process.

On the other hand, when touching the touch panel 18 is started (S11: YES), the CPU 41 proceeds to S12. In S12, the CPU 41 determines whether a position touched on the touch panel 18 (hereinafter, referred to as "touch position") is placed in any one of facility frames set around respective facility icons in a map image displayed on the screen. Note that the touch position is, for example, expressed by coordinates. In addition, a rectangular or circular facility frame having a center at each facility icon is set around the facility icon. However, each facility frame is not displayed in the map image.

Figure 4:
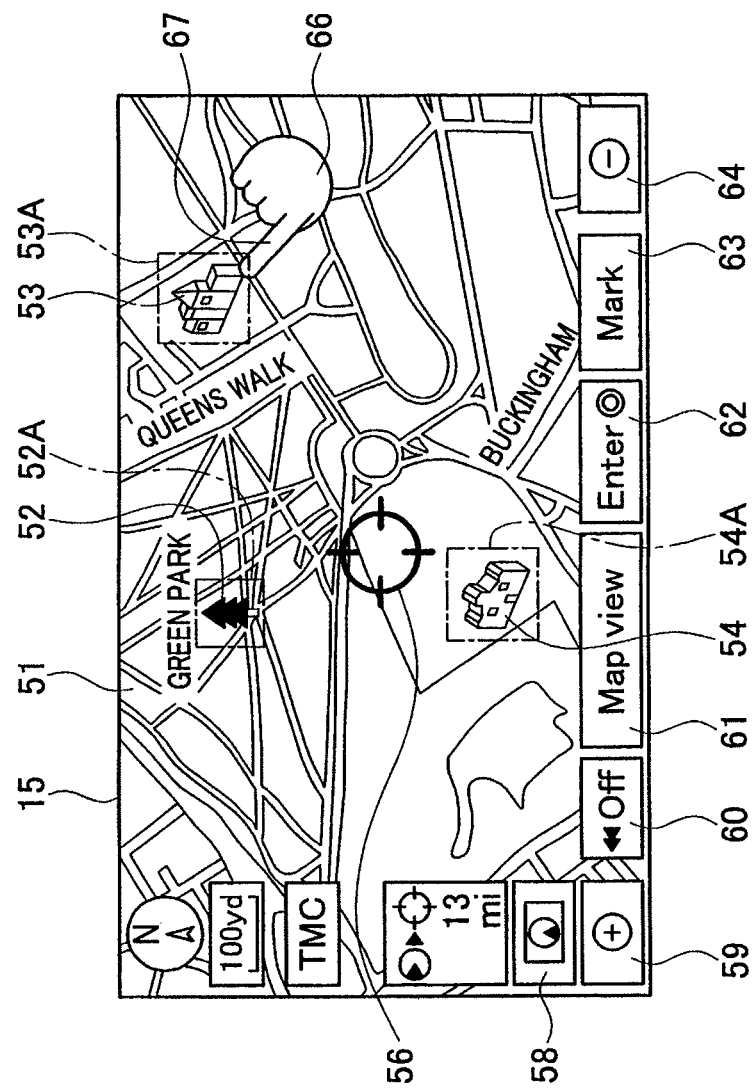
FIG. 4 is a view that shows an example of a state where touching the screen is started.

Here, an example of a map image displayed on the liquid crystal display 15 will be described with reference to FIG. 4. As shown in FIG. 4, a facility icon 52 that indicates a park, a facility icon 53 that indicates a palace and a facility icon 54 that indicates an official residence are shown in a map image 51 displayed on the liquid crystal display 15. In addition, rectangular facility frames 52A, 53A and 54A respectively having centers at the center positions of the facility icons 52 to 54, that is, the positions (for example, coordinates that are each composed of a latitude and a longitude) in the map of facilities corresponding to the facility icons 52 to 54, are set around the respective facility icons 52 to 54. Note that the facility frames 52A to 54A are not displayed in the map image 51.

In addition, a cursor 56 that indicates the center position of the screen of the liquid crystal display 15 is displayed at the center position of the screen. In addition, a screen switching button 58, a detailed map button 59, a button display OFF button 60, a map mode switching button 61, a destination setting button 62, a location memory button 63, a wide-area map button 64, and the like, are displayed at a peripheral area of the screen. The screen switching button 58 issues a command for switching between a one-screen view and a two-screen view. The detailed map button 59 issues a command for magnifying the map. The button display OFF button issues a command for turning off a display of buttons. The map mode switching button 61 issues a command for switching a map mode. The destination setting button 62 issues a command for starting to set a destination. The location memory button 63 issues a command so as to store the position of a facility or a location. The wide-area map button 64 issues a command for magnifying a displayed map area. Thus, the user may input commands corresponding to the respective buttons 58 to 64 by touching the buttons 58 to 64.

Then, as shown in FIG. 2, when it is determined that the touch position is not placed in any one of the facility frames set around the facility icons in the map image displayed on the screen (S12: NO), the CPU 41 proceeds to S14.

On the other hand, when the touch position is placed in any of the facility frames set around the facility icons in the map image displayed on the screen (S12: YES), the CPU 41 proceeds to S13. In S13, the CPU 41 scrolls the map image so that the center of the facility icon in the facility frame in which the touch position is placed, that is, the position in the map of the facility corresponding to the facility icon, coincides with the touch position.

Figure 5:
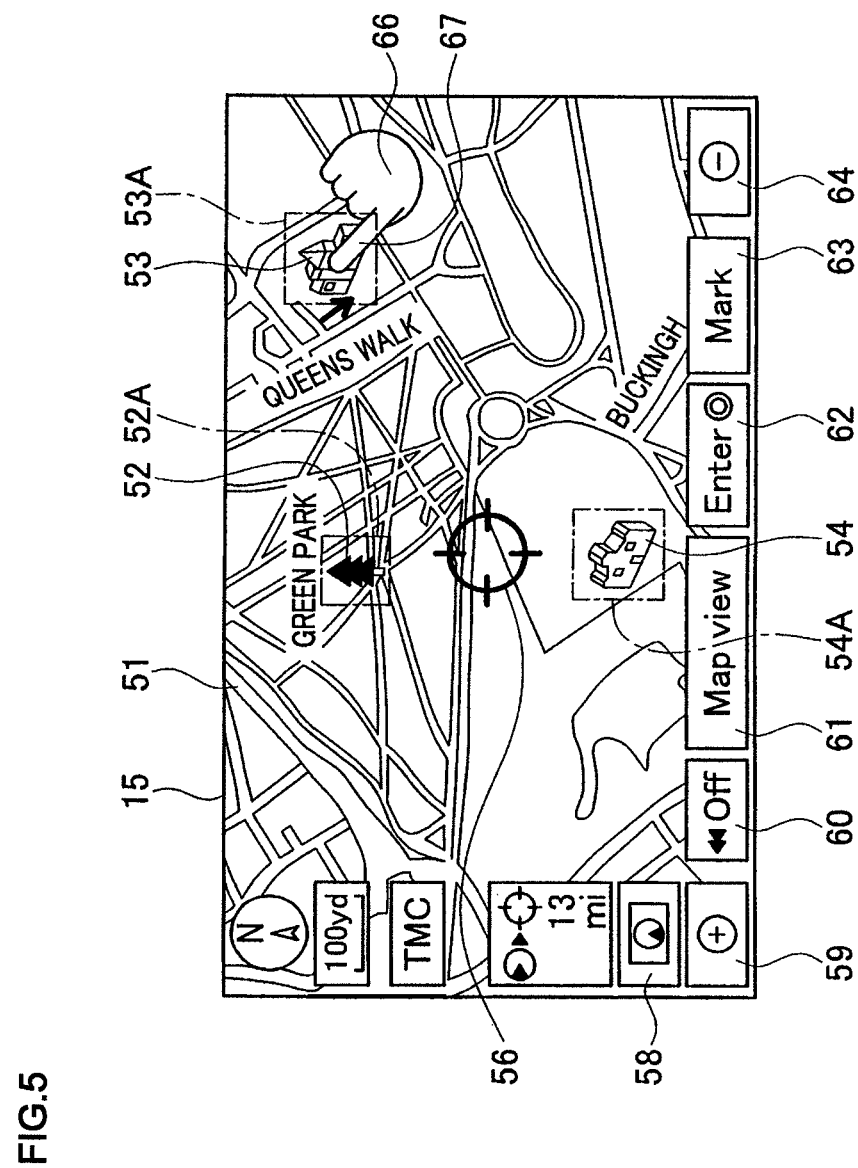
FIG. 5 is a view that shows an example of a map image that is scrolled in S13 of FIG. 2.

For example, as shown in FIG. 4, when the user touches the inside of a facility frame 53A of the facility icon 53 with an index finger 67 of a right hand 66, the map image 51 is scrolled so that the center position of the facility icon 53, that is, the position of the facility corresponding to the facility icon 53, coincides with the touch position of the index finger 67, as shown in FIG. 5. Thus, the center position of the facility icon 53 moves to the touch position of the index finger 67.

Subsequently, in S14, the CPU 41 determines whether touching the touch panel 18 is released, that is, whether touching the screen of the liquid crystal display 15 is released. Then, when it is determined that touching the screen of the liquid crystal display 15 is not released, that is, when touching the touch panel 18 is continued (S14: NO), the CPU 41 proceeds to S15.

Figure 6:
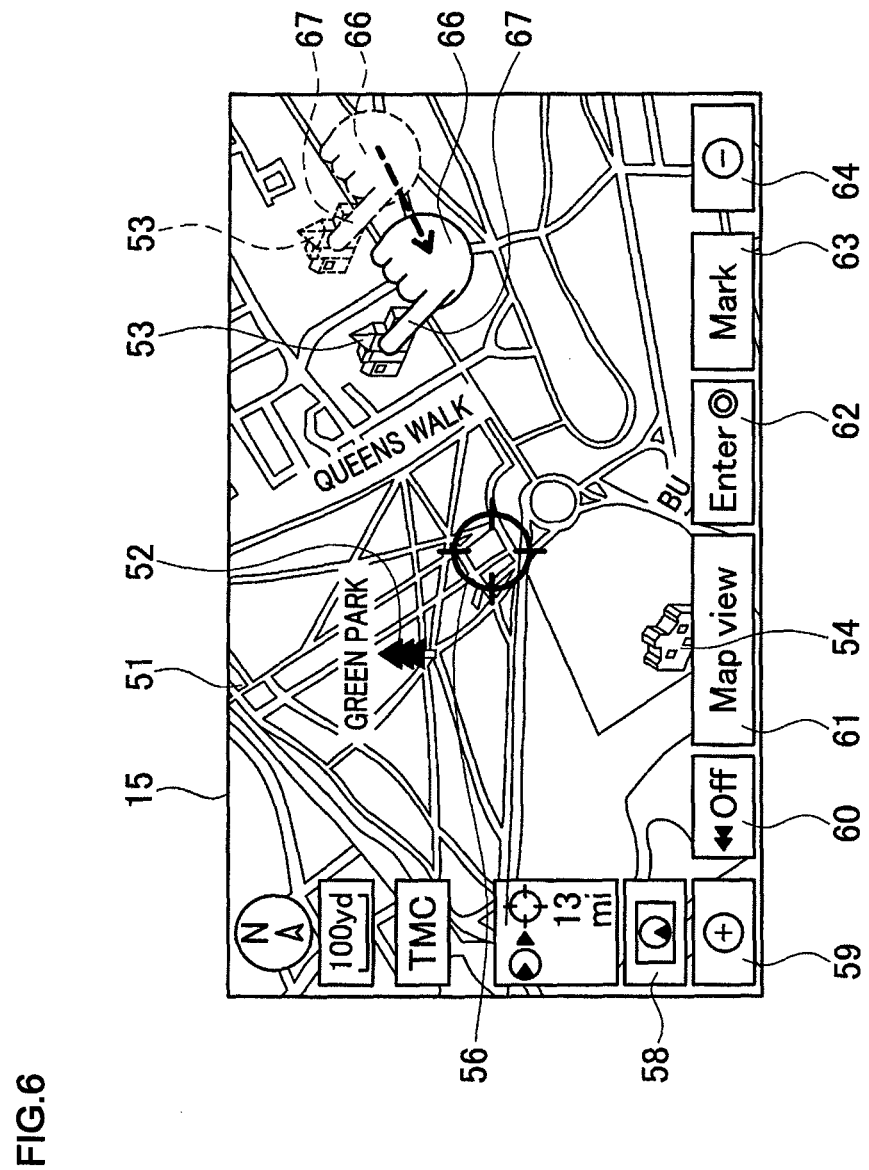
FIG. 6 is a view that shows an example of a map image that undergoes follow scrolling in S15 of FIG. 2.

In S15, the CPU 41 performs the follow scrolling of the map image so that a location in the map, corresponding to the touch position, moves following movement of the touch position as the touch position moves. For example, as shown in FIG. 6, when the index finger 67 is moved diagonally left downward while the index finger 67 remains touching the screen of the liquid crystal display 15, the CPU 41 performs the follow scrolling of the map image 51 so that the center position of the facility icon 53 moves following the touch position as the touch position of the index finger 67 moves.

Subsequently, in S16, the CPU 41 determines whether any one of the facility icons is placed in or on a cursor frame set around a cursor displayed at the center position of the screen. Note that a rectangular or circular cursor frame having a center at the cursor is set so as to circumscribe the cursor or set around the outside of the cursor. However, the cursor frame is not displayed in the map image.

Then, when it is determined that all the facility icons are not placed in or on the cursor frame (S16: NO), the CPU 41 returns to S14. On the other hand, when it is determined that any one of the facility icons is placed in or on the cursor frame (S16: YES), the CPU 41 proceeds to S17. In S17, the CPU 41 scrolls the map image so that the center position of the facility icon that is placed in or on the cursor frame, that is, the position in the map of the facility corresponding to the facility icon, moves to the center position of the cursor frame, and then returns to S14.

Figure 7:
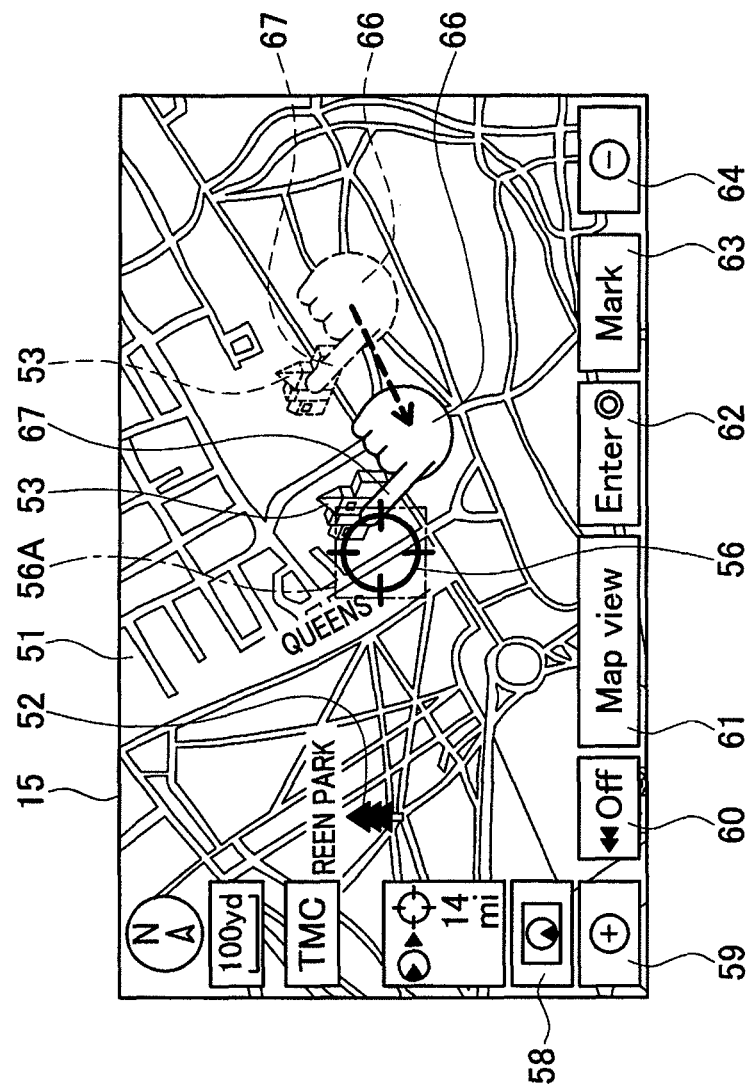
FIG. 7 is a view that shows an example of a map image in which a facility icon is placed in a cursor frame.

For example, as shown in FIG. 7, a substantially ring-shaped cursor 56 is displayed at the center position of the screen, and a substantially square cursor frame 56A that circumscribes the cursor 56 is set. Note that the cursor frame 56A is not displayed in the map image 51. In addition, the cursor frame 56A may have a rectangular shape that is slightly larger than the cursor 56. In addition, the cursor frame 56A may have, for example, a circular shape whose diameter is substantially the same as the diameter of the cursor 56 or slightly larger than the diameter of the cursor 56.

Figure 8:
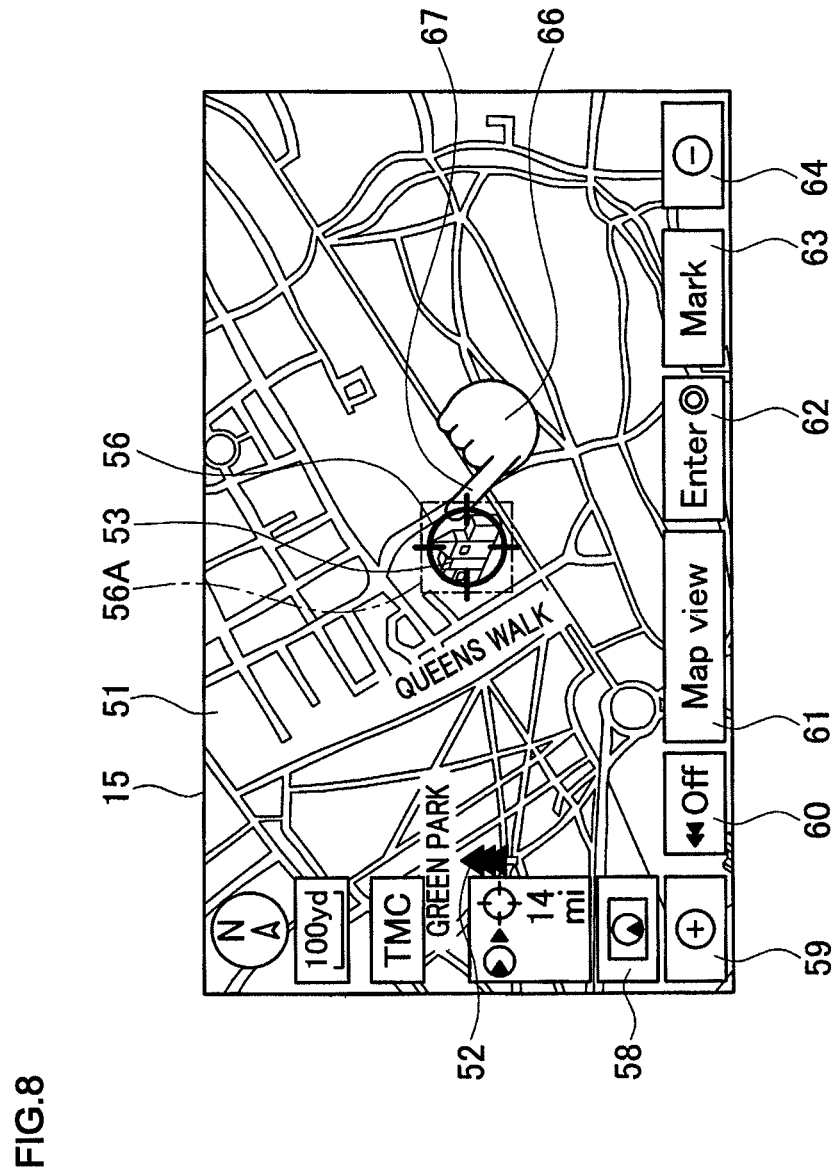
FIG. 8 is a view that shows an example of a map image that is scrolled in S17 of FIG. 2.

Then, as shown in FIG. 7, when the map image 51 undergoes the follow scrolling so as to follow movement of the index finger 67 touching the touch panel 18 and then the facility icon 53 is placed inside the cursor frame 56A, the CPU 41 determines that the facility icon 53 is placed on the cursor frame 56A. Subsequently, as shown in FIG. 8, the CPU 41 scrolls the map image 51 so that the center position of the facility icon 53, that is, the position of the facility corresponding to the facility icon 53, moves from the touch position of the index finger 67 to the center position of the cursor frame 56A. After that, the CPU 41 returns to S14.

On the other hand, when it is determined in S14 that touching the screen of the liquid crystal display 15 is released, that is, when it is determined that the finger is released from the touch panel 18 (S14: YES), the CPU 41 proceeds to S18.

In S18, the CPU 41 sets the scroll direction and initial speed of the map image on the basis of the moving direction and moving speed of the finger, that is, the touch position, at the time when touching the screen is released. Specifically, the CPU 41 detects the touch position on the touch panel 18 at an interval of a predetermined period of time (for example, at an interval of 20 milliseconds), and the RAM 42 stores the last several touch positions (for example, last 10 touch positions). Then, the CPU 41 calculates the moving direction and moving speed of the touch position on the screen on the basis of the touch position immediately before touching is released from the touch panel 18 and the last touch position, sets the moving direction and the moving speed as the scroll direction and the initial scroll speed of the map image, and then stores them in the RAM 42.

Subsequently, in S19, the CPU 41 loads the initial scroll speed from the RAM 42, and then determines whether the initial scroll speed is higher than or equal to a given speed, that is, the finger touching the touch panel 18 is moved in the scroll direction at or above the given speed. For example, when the screen has a resolution of 800 by 600 dots, the CPU 41 determines whether the initial scroll speed is higher than or equal to 300 dots/s.

Then, when it is determined that the initial scroll speed loaded from the RAM 42 is lower than the given speed, that is, when it is determined that the finger touching the touch panel 18 is not moved in the scroll direction at or above the given speed (S19: NO), the CPU 41 proceeds to S21. In S21, the CPU 41 stops scrolling the map image, and then ends the process.

Figure 9:
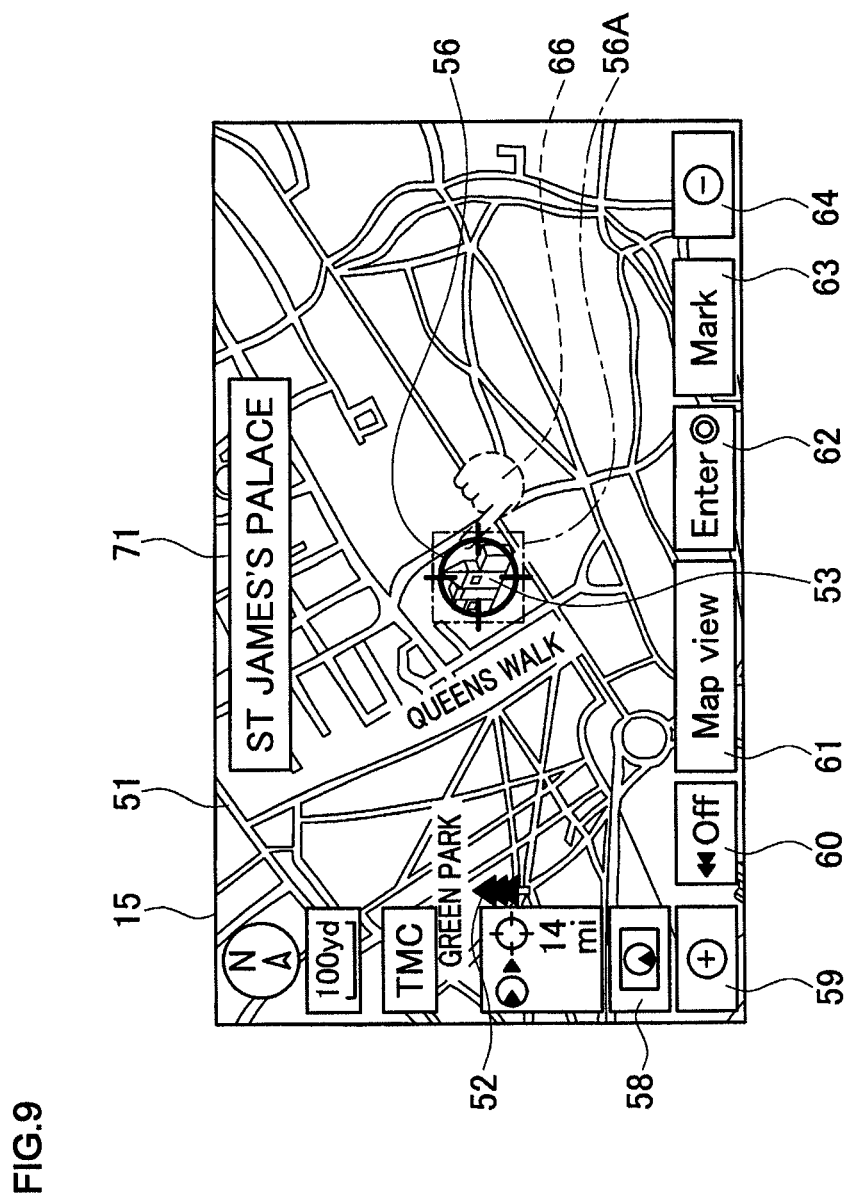
FIG. 9 is a view that shows an example of a map image from which touching the screen is released.

For example, as shown in FIG. 9, when the index finger 67 moves substantially vertically with respect to the touch panel 18 in the direction away from the touch panel 18 and then touching the touch panel 18 is released, the moving speed of the touch position on the screen is smaller than the given speed, so the scroll of the map image 51 stops. That is, the center position of the facility icon 53 is scrolled so as to move to the center position of the cursor 56, and is then stopped and displayed at the stopped position. In addition, when the facility icon 53 is displayed at the center position of the cursor 56 at the time when the scroll of the map image 51 is stopped, the CPU 41 displays a guide 71, such as the name of the facility corresponding to the facility icon 53, at the upper peripheral area of the screen.

On the other hand, when it is determined that the initial scroll speed loaded from the RAM 42 is higher than or equal to the given speed (S19: YES), the CPU 41 proceeds to S20 and executes a sub-process (see FIG. 3) of an inertial scrolling process, which will be described later, after which the CPU 41 proceeds to S21. In S21, the CPU 41 stops the scroll of the map image, and then ends the process.

Figure 3:
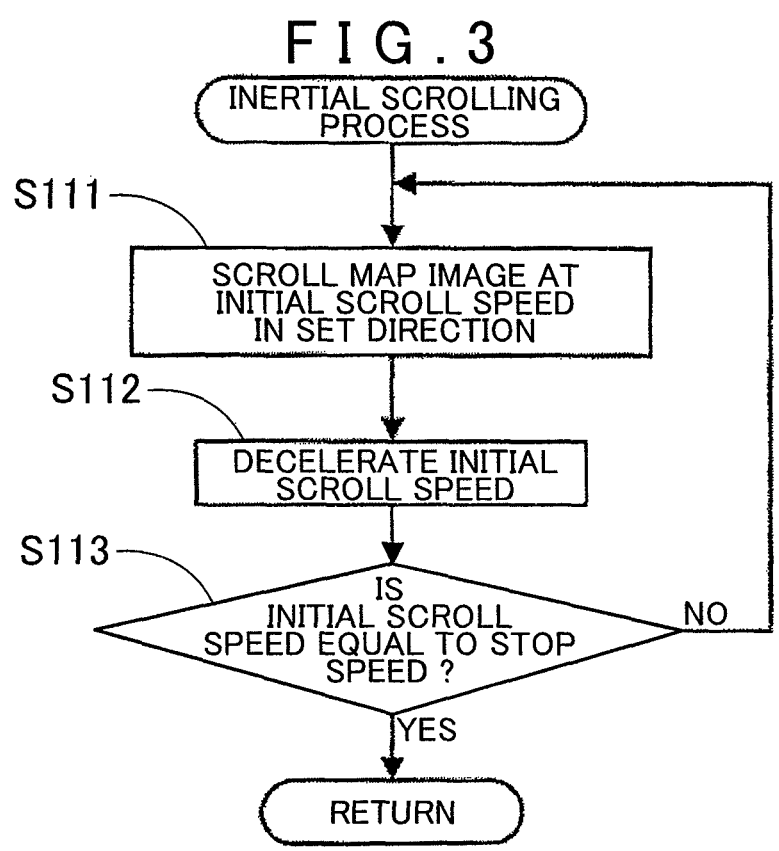
FIG. 3 is a sub-flowchart that shows a sub-process of an inertial scrolling process, which is a sub-process of FIG. 2.

Here, the sub-process of the inertial scrolling process executed by the CPU 41 in S20 will be described with reference to FIG. 3. As shown in FIG. 3, first, in S111, the CPU 41 loads the scroll direction and initial scroll speed of the map image from the RAM 42, and then performs inertial scrolling of the map image in the scroll direction at the initial scroll speed for a predetermined constant period of time (for example, 100 milliseconds).

Then, in S112, the CPU 41 loads the initial scroll speed from the RAM 42 and decelerates the initial scroll speed by a given reduction speed (for example, 30 dots/s), and then stores the decelerated speed in the RAM 42 as the initial scroll speed again. That is, the CPU 41 decelerates the scroll speed of the map image. Subsequently, in S113, the CPU 41 loads the initial scroll speed from the RAM 42, and then determines whether the initial scroll speed is a stop speed. Specifically, the CPU 41 determines whether the initial scroll speed is lower than or equal to 0 dots/s.

Then, when the initial scroll speed is not the stop speed (S113: NO), the CPU 41 returns to S111. On the other hand, when the initial scroll speed is the stop speed (S113: YES), the CPU 41 ends the sub-process and returns to the main flowchart, after which the CPU 41 proceeds to S21.

Figure 10:
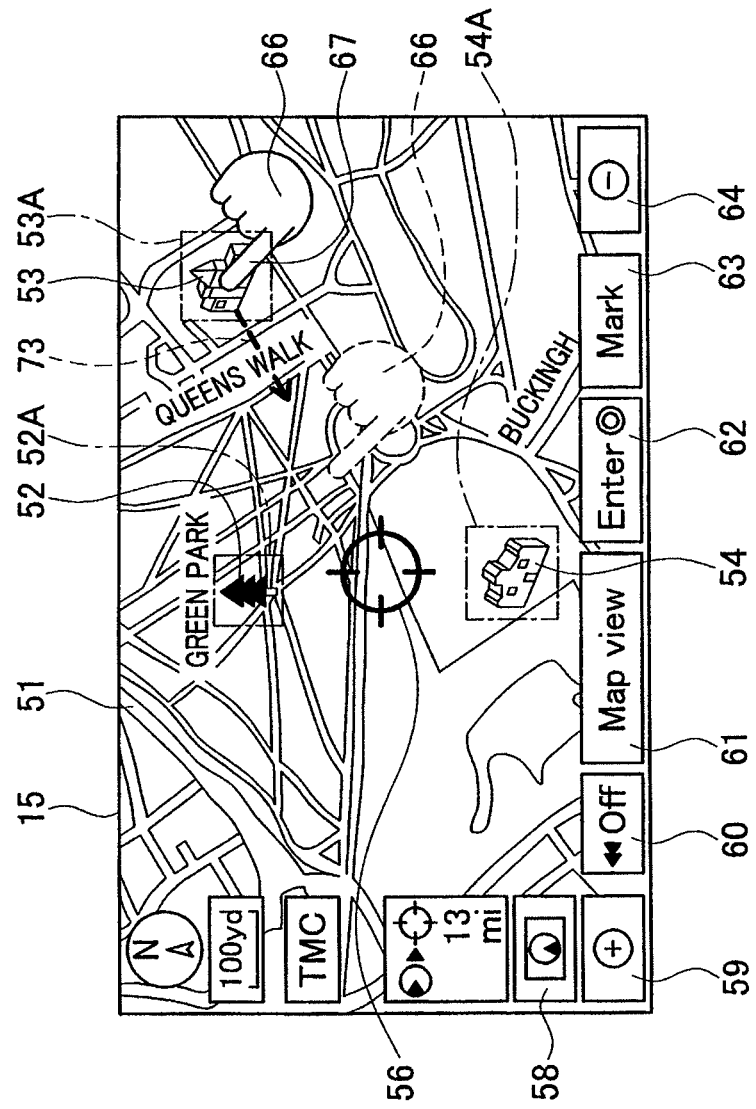
FIG. 10 is a view that shows an example of a state where a finger is quickly slid on the screen.

For example, as shown in FIG. 10, when the user releases the index finger 67 touching the center position of the facility icon 53 from the touch panel 18 while moving the index finger 67 so as to be pushed in the direction toward the cursor 56 (the direction indicated by an arrow 73), the CPU 41 sets the direction from the center position of the facility icon 53 toward the center position of the cursor 56 as the scroll direction of the map image 51 and then stores the scroll direction in the RAM 42. In addition, the CPU 41 calculates the moving speed of the index finger 67 on the basis of a distance between the touch position immediately before touching the touch panel 18 is released and the last touch position, sets the moving speed as the initial scroll speed at which the map image 51 is scrolled, and then stores the initial scroll speed in the RAM 42.

Figure 11:
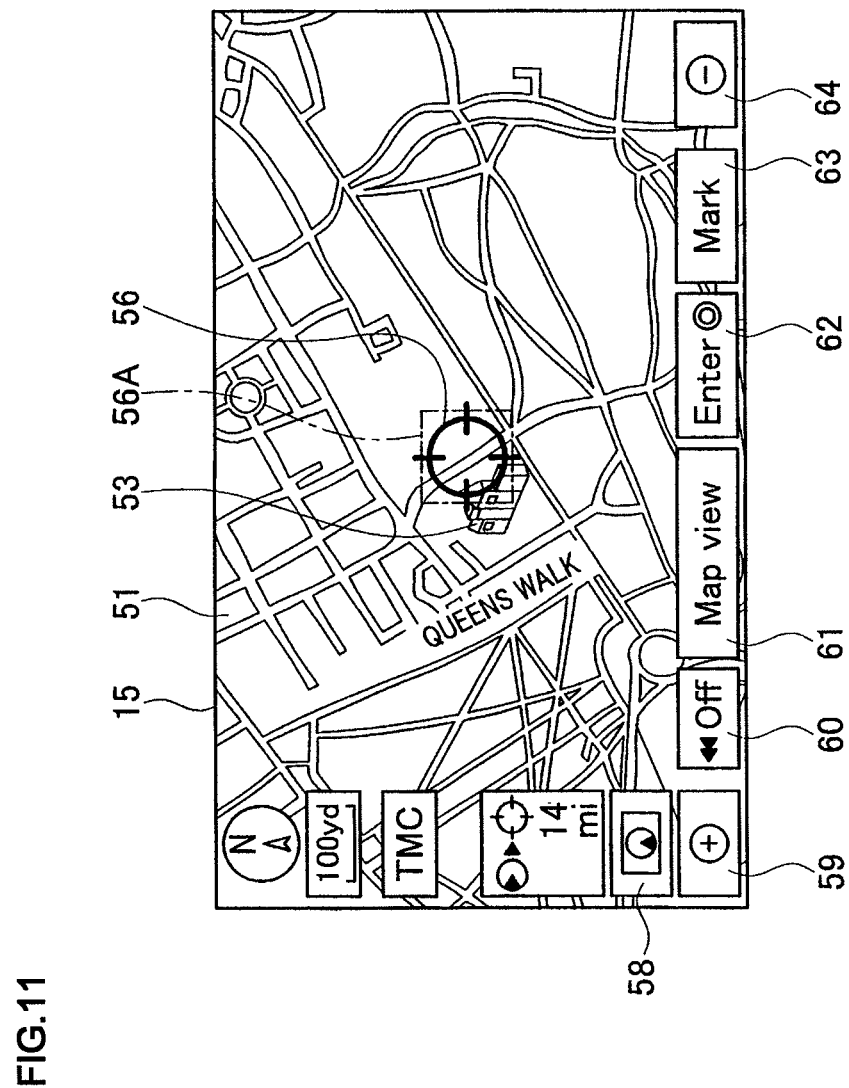
FIG. 11 is a view that shows an example of a map image that undergoes inertial scrolling.

Then, as shown in FIG. 10 and FIG. 11, the CPU 41 performs the inertial scrolling of the map image 51 in the direction from the center position of the facility icon 53 toward the center position of the cursor 56 under the condition that the moving speed of the touch position at which the index finger 67 is released from the touch panel 18 is set as the initial scroll speed. Then, even when the facility icon 53 is placed in the cursor frame 56A while the map image 51 is undergoing the inertial scrolling, the CPU 41 continues the inertial scrolling and then stops the inertial scrolling. Thus, as shown in FIG. 11, the facility icon 53 passes through the center position of the cursor 56, and is stopped and displayed in a state where the facility icon 53 is placed on the lower left corner of the cursor frame 56A.

As described in detail above, in the navigation system 1 according to the present embodiment, when the user moves a finger while the finger remains touching a map image, the CPU 41 performs the follow scrolling of the map image so as to follow movement of the touch position. Then, when the CPU 41 determines that any one of facility icons displayed in the map image is placed in or on the cursor frame, the CPU 41 scrolls the map image so that the center position of the facility icon moves to the center position of the cursor.

Thus, the user touches the facility icon and then moves the finger touching the facility icon to around the cursor while seeing the cursor. By so doing, it is possible to easily display the center position of the facility icon so as to coincide with the center position of the cursor.

In addition, when touching the touch panel 18 is started, the CPU 41 determines whether the touch position is placed in a facility frame having a center at a facility icon displayed in the map image, and then, when it is determined that the touch position is placed in the facility frame, the map image is scrolled so that the center position of the facility icon moves to the touch position. By so doing, even when the user does not touch the center position of the facility icon displayed in the map image, the user touches a position within the facility frame set around the facility icon to thereby make the position touched by the user possible to coincide with the center position of the facility icon.

In addition, when the moving speed of the finger immediately before touching the touch panel 18 is released, that is, when the moving speed of the touch position is lower than a given speed, the CPU 41 cancels the inertial scrolling of the map image. Therefore, the user moves the finger touching the facility icon to around the cursor and then moves the finger substantially vertically with respect to the touch panel 18 in the direction away from the touch panel 18 so that the moving speed of the touch position is lower than the given speed to thereby release touching the touch panel 18. By so doing, the map image may be stopped and displayed at the stopped position. Thus, when the user moves the finger touching the facility icon to within a given region having a center at the cursor, the center position of the facility icon may be stopped and displayed so as to coincide with the center position of the cursor.

Furthermore, when the map image undergoes the inertial scrolling after touching the touch panel 18 is released, the CPU 41 continues the inertial scrolling even when a facility icon overlaps the cursor frame having a center at the cursor. Thus, the user touches a facility icon displayed in the map image with a finger and then quickly slides the finger in the direction toward the cursor to thereby make it possible to scroll the facility icon in the direction toward the cursor. In addition, even when the center position of the facility icon is placed in the cursor frame having a center at the cursor, the center position of the facility icon is not moved to the center position of the cursor, and the inertial scrolling may be continued.

Note that the aspect of the present invention is not limited to the above embodiment; of course, the aspect of the present invention may be improved or modified into various forms without departing from the scope of the invention.

(A) For example, in S16, the CPU 41 may determine whether the facility frame of any one of the facility icons is placed in or on the cursor frame set around the cursor displayed at the center position of the screen. Then, when it is determined that the facility frames of all the facility icons are not placed in or on the cursor frame (S16: NO), the CPU 41 may return to S14.

On the other hand, when it is determined that the facility frame of any one of the facility icons is placed in or on the cursor frame (S16: YES), the CPU 41 may proceed to S17. In S17, the CPU 41 may scroll the map image so that the center position of the facility icon in the facility frame placed in or on the cursor frame, that is, the position in the map of the facility corresponding to the facility icon, moves to the center position of the cursor frame, and then may return to S14.

Thus, the user moves the finger touching the facility icon to a position adjacent to the cursor to thereby make it possible to further easily display the center position of the facility icon so as to coincide with the center position of the cursor.

(B) In addition, for example, in S16, when the center position of the facility icon coincides with the touch position, the CPU 41 may determine whether the touch position is placed in or on the cursor frame set around the cursor displayed at the center position of the screen. Then, when it is determined that the touch position is not placed in or on the cursor frame (S16: NO), the CPU 41 may return to S14.

On the other hand, when it is determined that the touch position is placed in or on the cursor frame (S16: YES), the CPU 41 may proceed to S17. In S17, the CPU 41 may scroll the map image so that the center position of the facility icon placed in or on the cursor frame, that is, the position in the map of the facility corresponding to the facility icon, moves to the center position of the cursor frame, and then may return to S14.

Thus, the user moves the finger touching the facility icon to a position adjacent to the cursor to thereby make it possible to further easily display the center position of the facility icon so as to coincide with the center position of the cursor.

What is claimed is:

1. A map display system comprising:
a CPU performing a map display method comprising:
storing map information including information on a facility icon;
displaying a map image including the facility icon on a screen of a display device on the basis of the map information;
detecting a touch position on the screen of the display device when the screen is touched by a user; and
performing follow scrolling in which the map image is scrolled following movement of the touch position detected, and performing inertial scrolling in which the map image is scrolled on the basis of a moving direction and a moving speed of the touch position at the time when touching the screen is released, wherein
the touch position is placed on a facility frame set around the facility icon, performing a control to scroll the map image so that the facility icon moves to the touch position,
when the facility icon is placed in a first given region having a center at a cursor displayed on the screen while the follow scrolling is being performed in a state in which the facility icon is touched, performing a control to scroll the map image so that a center position of the facility icon moves to a center position of the cursor regardless of the touch position, the cursor indicating a center position of the screen of the display device, and
when the facility icon is placed in the first given region while the inertial scrolling is being performed, performing a control so that the inertial scrolling continues.

2. The map display system according to claim 1, further comprising:
determining whether a second touch position is in a second given region different from the first region having a center at the facility icon in the map image, wherein
when it is determined that the second touch position is placed in the second given region, scrolling the map image so that a center position of the facility icon moves to the touch position.

3. The map display system according to claim 1, wherein performing a control to stop the inertial scrolling when the moving speed of the touch position immediately before touching the screen of the display unit is released is lower than a given speed.

4. A map display method comprising:
displaying a map image including a facility icon on a display device on the basis of map information including information on the facility icon stored in a map information storing device;
detecting a touch position when a screen of the display device is touched;
performing a control to perform follow scrolling in which the map image is scrolled following movement of the detected touch position; and
performing a control to perform inertial scrolling in which the map image is scrolled on the basis of a moving direction and a moving speed of the touch position at the time when touching the screen is released;
wherein the touch position is placed on a facility frame set around the facility icon, performing a control to scroll the map image so that the facility icon moves to the touch position,
when the facility icon is placed in a given region having a center at a cursor displayed on the screen while the follow scrolling is being performed in a state in which the facility icon is touched, performing a control to scroll the map image so that a center position of the facility icon moves to a center position of the cursor regardless of the touch position, the cursor indicating a center position of the display device, and
when the facility icon is placed in the given region while the inertial scrolling is being performed, performing a control so that the inertial scrolling continues.

5. A non-transitory computer-readable storage medium that stores computer-executable instructions for performing a map display method comprising:
displaying a map image including a facility icon on a display device on the basis of map information including information on the facility icon stored in a map information storing device;
detecting a touch position when a screen of the display device is touched;
performing a control to perform follow scrolling in which the map image is scrolled following movement of the detected touch position; and
performing a control to perform inertial scrolling in which the map image is scrolled on the basis of a moving direction and a moving speed of the touch position at the time when touching the screen is released;

wherein the touch position is placed on a facility frame set around the facility icon, performing a control to scroll the map image so that the facility icon moves to the touch position, when the facility icon is placed in a given region having a center at a cursor displayed on the screen while the follow scrolling is being performed in a state in which the facility icon is touched, performing a control to scroll the map image so that a center position of the facility icon moves to a center position of the cursor regardless of the touch position, the cursor indicating a center position of the display device, and when the facility icon is placed in the given region while the inertial scrolling is being performed, performing a control so that the inertial scrolling continues.

* * * * *